United States Patent
Mittermaier

(10) Patent No.: US 8,195,391 B2
(45) Date of Patent: Jun. 5, 2012

(54) ROUTE FINDING SYSTEM AND METHOD HAVING A ROUTE OPTION FOR AVOIDING HAZARDOUS TURNING MANEUVERS

(75) Inventor: Werner Mittermaier, Erding (DE)

(73) Assignee: Rohde & Schwarz GmbH & Co. KG, Müchen (DE)

( * ) Notice: Subject to any disclaimer, the term of this patent is extended or adjusted under 35 U.S.C. 154(b) by 445 days.

(21) Appl. No.: 12/529,319

(22) PCT Filed: Feb. 20, 2008

(86) PCT No.: PCT/EP2008/001327
§ 371 (c)(1),
(2), (4) Date: Sep. 24, 2009

(87) PCT Pub. No.: WO2008/125162
PCT Pub. Date: Oct. 23, 2008

(65) Prior Publication Data
US 2010/0030464 A1 Feb. 4, 2010

(30) Foreign Application Priority Data
Apr. 17, 2007 (DE) .......................... 10 2007 018 084

(51) Int. Cl.
*G01C 21/36* (2006.01)
*H04M 1/00* (2006.01)

(52) U.S. Cl. ..................... 701/410; 701/423; 701/430

(58) Field of Classification Search .................. 701/400, 701/408, 409, 410, 418, 420, 421, 423, 424, 701/425, 428, 430, 439, 446, 448, 461, 467; 340/995.1, 995.12, 995.14, 995.27
See application file for complete search history.

(56) References Cited

U.S. PATENT DOCUMENTS

| 5,612,882 | A | 3/1997 | LeFebvre et al. |
| 5,910,177 | A | 6/1999 | Zuber |
| 6,490,522 | B2 | 12/2002 | Sugiyama et al. |
| 7,779,066 | B2 * | 8/2010 | Igarashi ........................ 709/203 |

(Continued)

FOREIGN PATENT DOCUMENTS

DE 10 2006 031 877 A1 1/2007

(Continued)

OTHER PUBLICATIONS

International Search Report for PCT/EP2008/001327 dated May 19, 2008.

*Primary Examiner* — Richard M. Camby
(74) *Attorney, Agent, or Firm* — Marshall, Gerstein & Borun LLP

(57) ABSTRACT

A route finding system has a map database containing node data and edge data, wherein nodes represent points on a route and edges represent the connections between the nodes. A route search system determining an optimal route according to prescribed route parameters, wherein a route comprises at least one partial route, and a partial route comprises at least one edge, considers the difficulty of the partial routes during route finding. The abilities of the user and/or a user selection determine the influence of the difficulty of the partial routes on the route obtained during route search. Difficult partial routes are characterized by the necessity of carrying out difficult maneuvers, particularly turning maneuvers and/or crossing maneuvers, to complete the partial route.

17 Claims, 8 Drawing Sheets

U.S. PATENT DOCUMENTS

| | | | |
|---|---|---|---|
| 7,912,638 B2 * | 3/2011 | Devries et al. | 701/425 |
| 7,917,288 B2 * | 3/2011 | Cheung et al. | 701/410 |
| 8,019,537 B2 * | 9/2011 | DeVries et al. | 701/426 |
| 2007/0050133 A1 | 3/2007 | Yoshikawa et al. | |

FOREIGN PATENT DOCUMENTS

| | | |
|---|---|---|
| EP | 1471329 A2 | 10/2004 |
| EP | 1830161 A1 | 9/2007 |
| JP | 08016991 A | 1/1996 |
| JP | 08254433 A | 10/1996 |
| JP | 08313284 A | 11/1996 |
| JP | 10253379 A | 9/1998 |
| JP | 10325733 | 12/1998 |
| JP | 2005106475 A | 4/2005 |
| JP | 2007093451 A | 4/2007 |
| WO | WO-2006068268 A1 | 6/2006 |

* cited by examiner

ROUTE FINDING SYSTEM AND METHOD HAVING A ROUTE OPTION FOR AVOIDING HAZARDOUS TURNING MANEUVERS

BACKGROUND OF THE INVENTION

1. Field of the Invention

The invention relates to a system and a method for finding routes, in particular, routes in traffic networks.

2. Related Technology

In conventional route-finding systems, the path of a sub-route and the time required for travel are used for the calculation of the most favorable route. European Patent Application EP 1 471 329 A2 discloses additional parameters relating to safety of travel for the calculation of the most favorable route. However, in this context, consideration is not given to the different skills of the users, for example, with regard to driving a motor vehicle. The influence of the difficulty of a sub-route on the route finding is identical for all users.

SUMMARY OF THE INVENTION

The invention provides a route-finding system and a corresponding method, which takes the skills of the individual user in overcoming difficult situations into consideration in the route finding.

Accordingly, the invention provides a route-finding system for locating a route within a terrain with a map databank of the terrain, which contains node data and edge data, wherein nodes represent points on a path, and edges represent the connections between nodes, and with a route search system, which, with specified route parameters, determines an optimal route, wherein:

a route comprises at least several sub-routes, each sub-route comprises at least one edge, a difficulty detector is present, which takes the difficulty of the sub-routes into consideration in the route finding, a user detector is present, which detects the skills of the users, which determines the influence of the difficulty of the sub-routes on the found route in the route finding, and/or a user selection, which determines the influence of the difficulty of the sub-routes on the found route in the route finding, and difficult sub-routes are characterized by the need to implement difficult maneuvers, in particular, turn maneuvers and/or crossing maneuvers, in order to travel the sub-route.

The invention further provides a method for route finding for locating a route within a terrain, which accesses a map databank of the terrain, in which node data and edge data are stored, wherein nodes represent points on a path, and edges represent the connections between the nodes, and which takes specified route parameters into consideration for the route finding, wherein:

a route comprises several sub-routes, each sub-route comprises at least one edge, the difficulty of the sub-routes is taken into consideration in the route finding, the user's skills and/or a user selection determines the influence of the difficulty of the sub-routes on the found route in the route finding, and difficult sub-routes are characterized by the need to implement difficult maneuvers, in particular, turn maneuvers and/or crossing maneuvers, in order to travel the sub-route.

In order to determine routes, a route-finding system with a databank and a route search system is used. The databank contains node data and edge data, wherein nodes represent points on a path, and edges represent the connections between the nodes. The route search system determines an optimal route with specified route parameters. The difficulty of the route is determined from the difficulty of the sub-routes, which are composed in each case of at least one edge. A sub-route is counted as difficult, if traveling it requires difficult maneuvers. The influence of the difficulty of a route on the route finding is determined through the user's skills and/or a user selection.

Accordingly, for inexperienced or insecure drivers, it is possible to avoid difficult routes. Traffic safety is improved as a result both for the user and also for other road users. For the determination of the difficulty of maneuvers, both static and also dynamic route parameters are advantageously used. These are determined by the route search system.

Through the use of static and dynamic parameters, both geographical conditions, such as the course of the road, and also ongoing conditions, such as any congestion, can be used in determining the difficulty of a route. Accordingly, the determination of the difficulty of a route is very precise. The advantageous determination of the position of the user for the route finding allows a simple input of the desired starting position. The advantageous integration of the system in a vehicle or portable device allows a continuous route finding during travel over the route.

BRIEF DESCRIPTION OF THE DRAWINGS

The invention is described by way of example below on the basis of the drawings, in which an advantageous exemplary embodiment of the invention is illustrated. The drawings are as follows.

DETAILED DESCRIPTION

Figure 3:
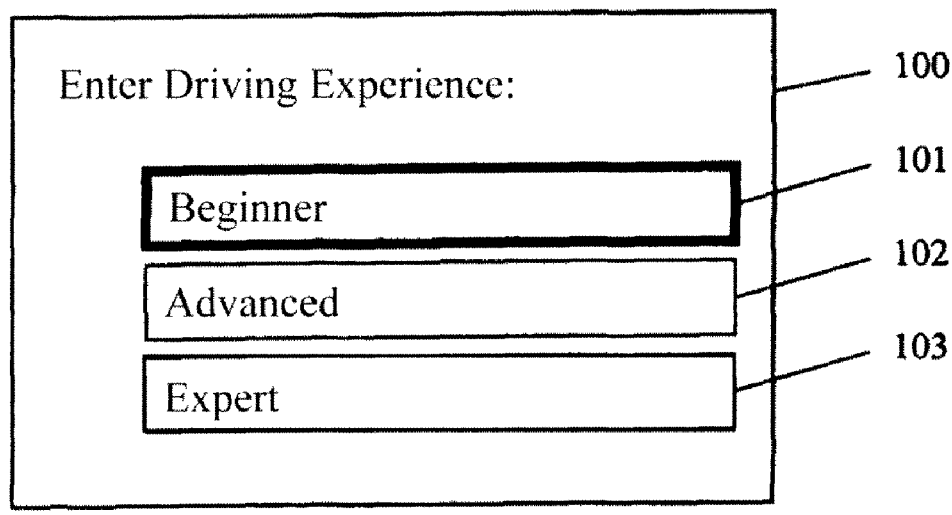
FIG. 3 shows a user dialogue for determining the driving experience of the user.
Figure 4:
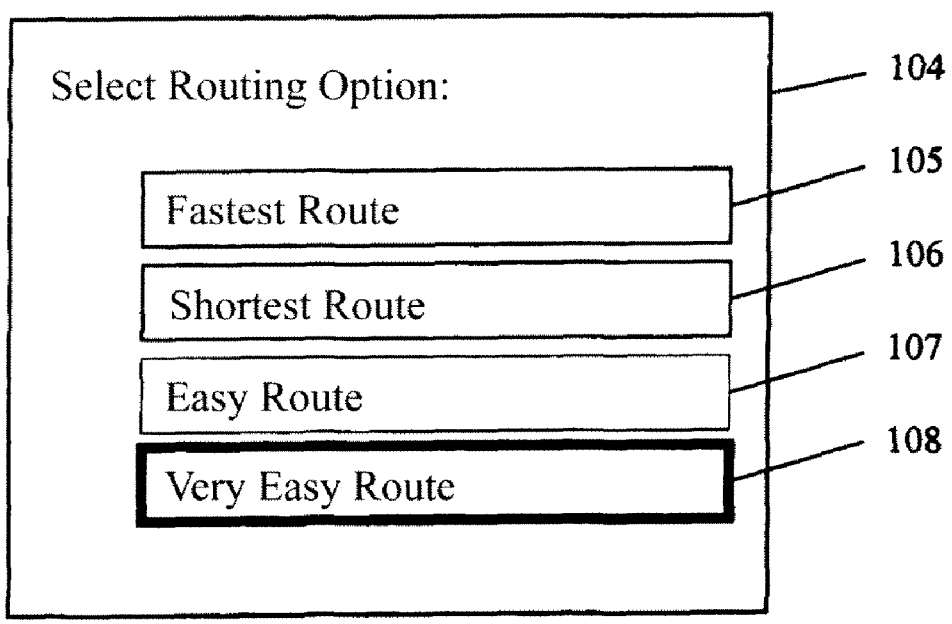
FIG. 4 shows a user dialogue for the selection of a routing option.
Figure 13:
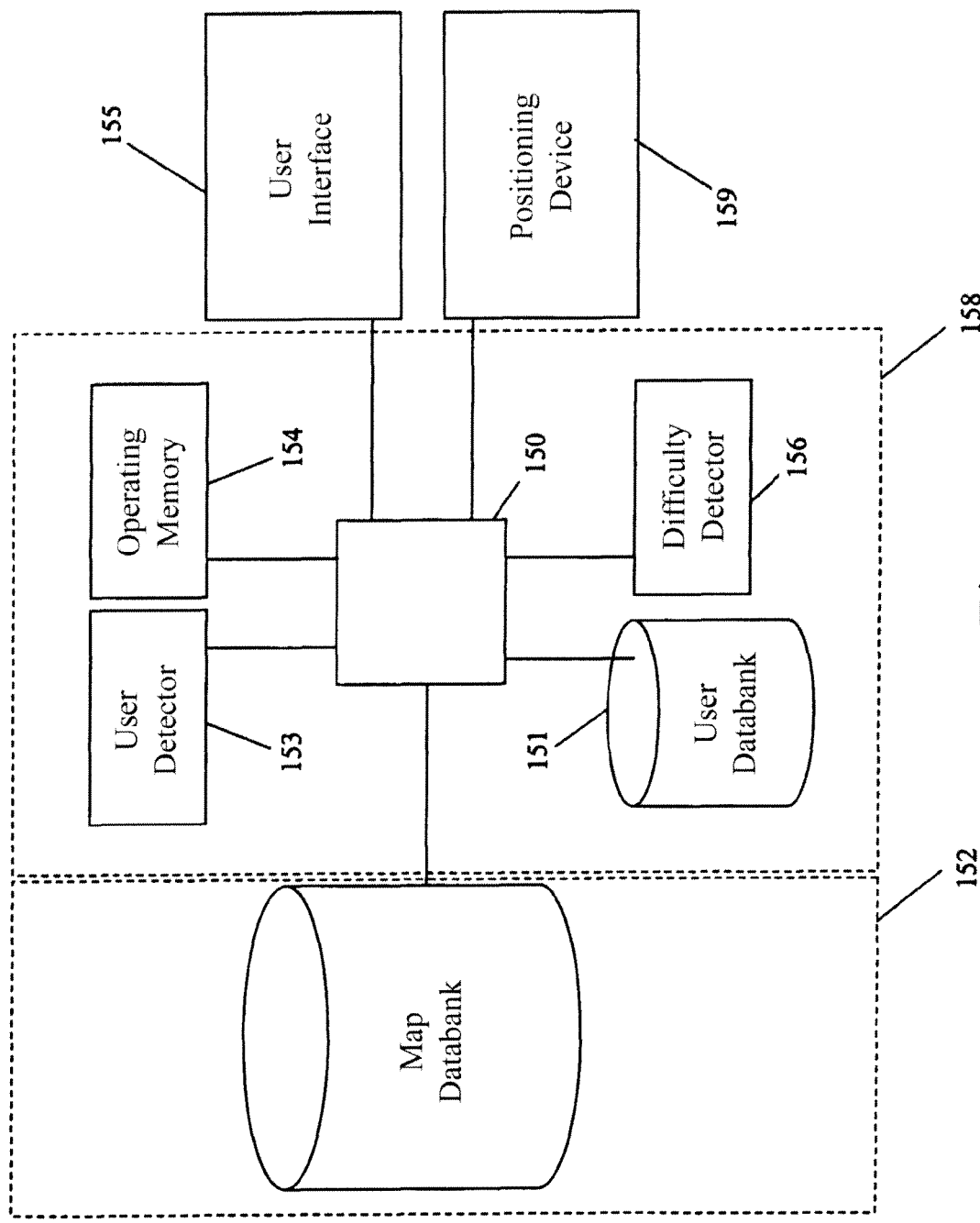
FIG. 13 shows a block-circuit diagram of an exemplary embodiment of the route-finding System according to the invention.
Figure 14:
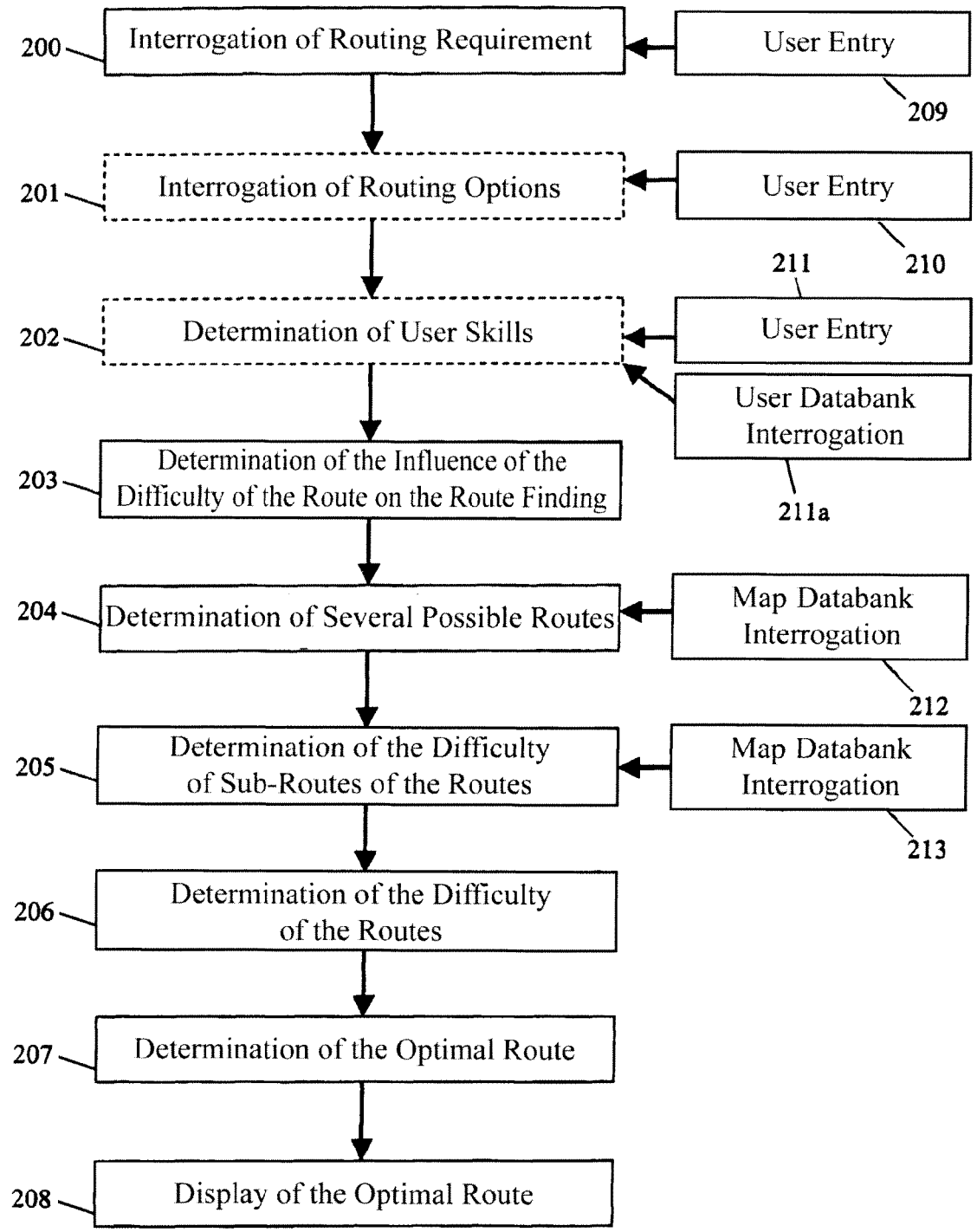
FIG. 14 shows a flow chart visualizing an exemplary embodiment of the method according to the invention.

The general problem will first be explained on the basis of the prior art with reference to FIGS. 1-2. With reference to FIGS. 3-4, the user's influence will then be explained. By means of FIGS. 5-12, the method of functioning of various exemplary embodiments of the device and the method according to the invention will then be shown with regard to different traffic situations. Finally, FIG. 13 shows a block-circuit diagram of the device according to the invention and FIG. 14 shows a flow chart of the method according to the invention. The presentation and description of identical elements in similar drawings have in some cases not been repeated.

Figure 1:
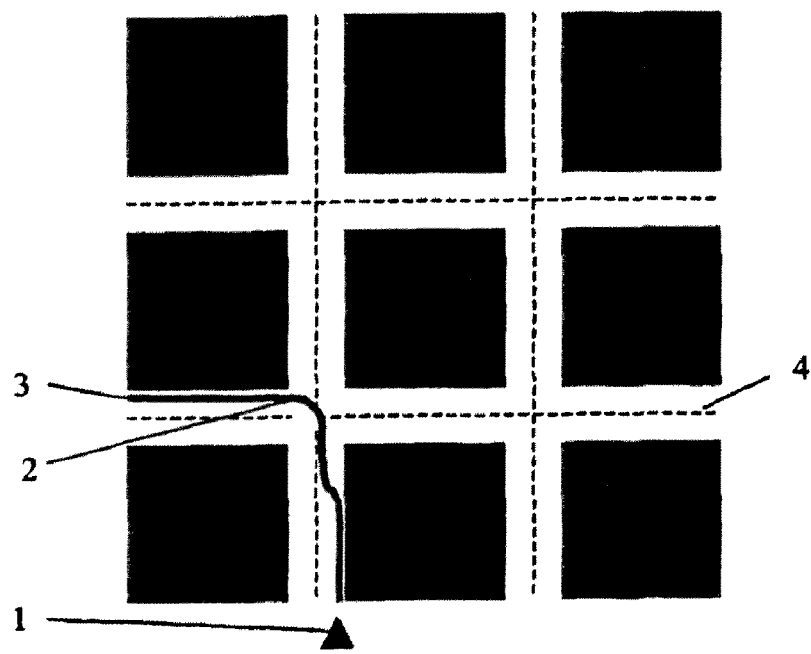
FIG. 1 shows an exemplary left-turn maneuver.

FIG. 1 shows an exemplary road course in plan view. The direction pointer 1 shows the direction of travel along the path of a road 4. The illustration shows a left-turn maneuver 2 at a crossing.

Figure 2:
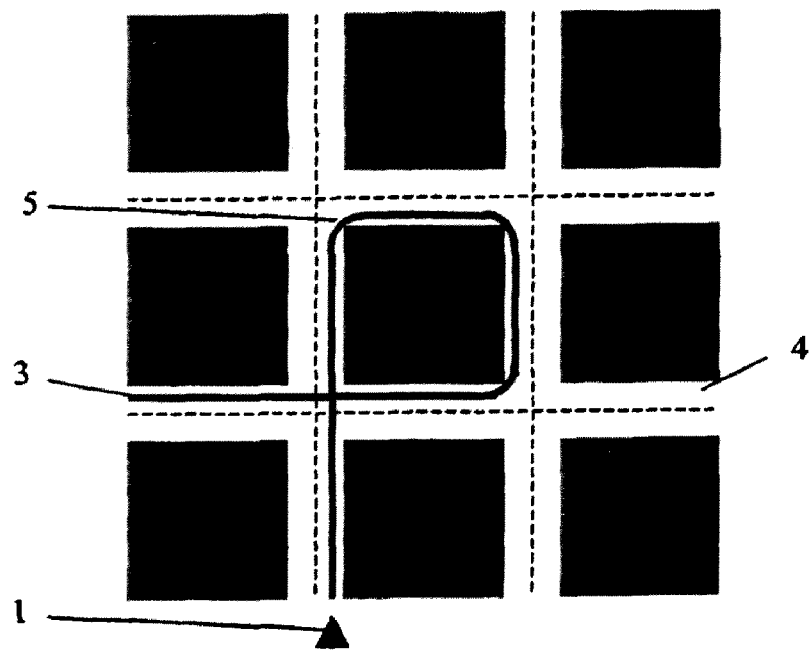
FIG. 2 shows an exemplary avoidance of a left-turn maneuver through several right-turn maneuvers.

FIG. 2 shows the exemplary road course from FIG. 1 in plan view. The illustration shows one possible route for avoiding the left-turn maneuver. Instead, a series of right-turn maneuvers 5 is implemented.

In the following section, the approach known from the prior art for avoiding left-turn maneuvers is presented, on one hand, by comparison with the skills and wishes of the user. On the other hand, it is shown that the difficulty of individual sub-routes is determined in a targeted manner, and, on this basis, the difficulty of the overall route is determined.

An exemplary user dialogue is shown in FIG. 3. On a display 100 of the route-finding system according to the invention, the user is questioned regarding her/his skills at driving vehicles. According to an entry by the user, the route finding is calculated utilizing the information relating to her/his skills. Accordingly, for users, who regard themselves as "beginners" 101, the difficulty of a route is taken into consideration very strongly in the route finding. For users, who regard themselves as "advanced" 102, the difficulty of the route is taken into consideration less strongly. The difficulty of a route is not taken into consideration in the route finding for users, who regard themselves as "experts" 103.

FIG. 4 shows an exemplary user dialogue. On a display 104 of the route-finding system according to the invention, the user is questioned regarding her/his wishes for the route to be determined. Routing options are offered. Alongside the routing options known from the prior art, such as "shortest route" 105 and "fastest route" 106, the new options "easy route" 107 and "very easy route" 108 are offered. In the selection of one of these new routing options, the difficulty of a route is taken into consideration in the route finding. In this context, in the selection "easy route" 107, the difficulty of a route is taken into consideration less strongly than in the case of the selection "very easy route" 108.

Figure 5:
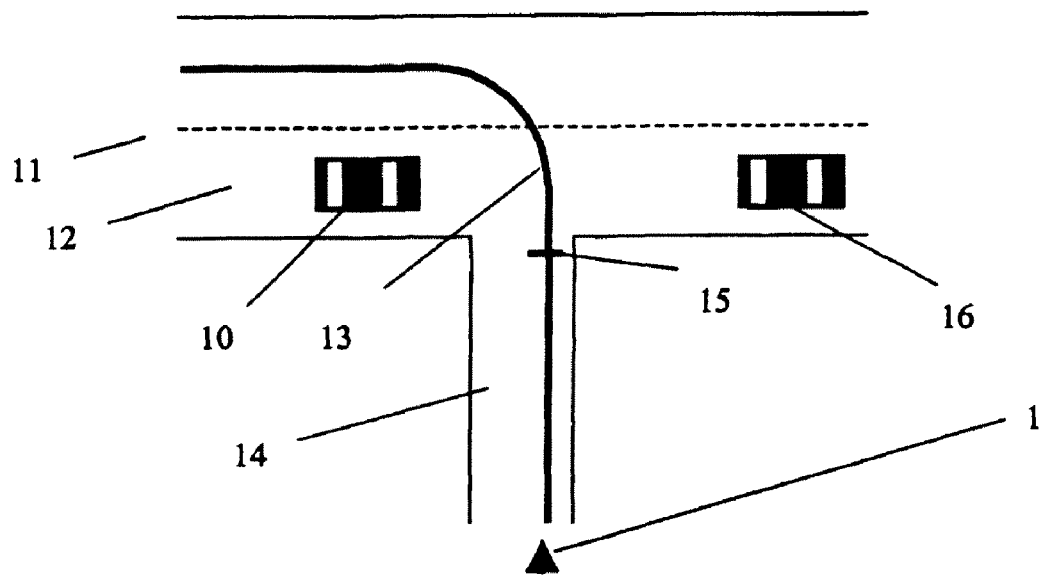
FIG. 5 shows an exemplary left-turn maneuver into a road with right of way.

FIG. 5 shows an exemplary left-turn maneuver. In this context, the turn maneuver is from a road 14 without right of way into a road 11 with right of way. Other vehicles 10, 16 are disposed in the oncoming lane 12 of the road 11 with right of way. The turn maneuver 13 crosses a stop line 15 upon entry into the road 11 with right of way. In this case, the road with right of way and the absence of traffic lights are decisive static parameters for judging the difficulty of the turn maneuver. The traffic 10, 16 on the road 11 with right of way is relevant as a dynamic parameter. Overall, a moderate difficulty is allocated to the turn maneuver. With a user, who regards herself/himself as an "beginner" 101, or who has selected "very easy route" 108, a maneuver of this kind could already be classified as too difficult, and an alternative route could be selected in the route finding.

Figure 6:
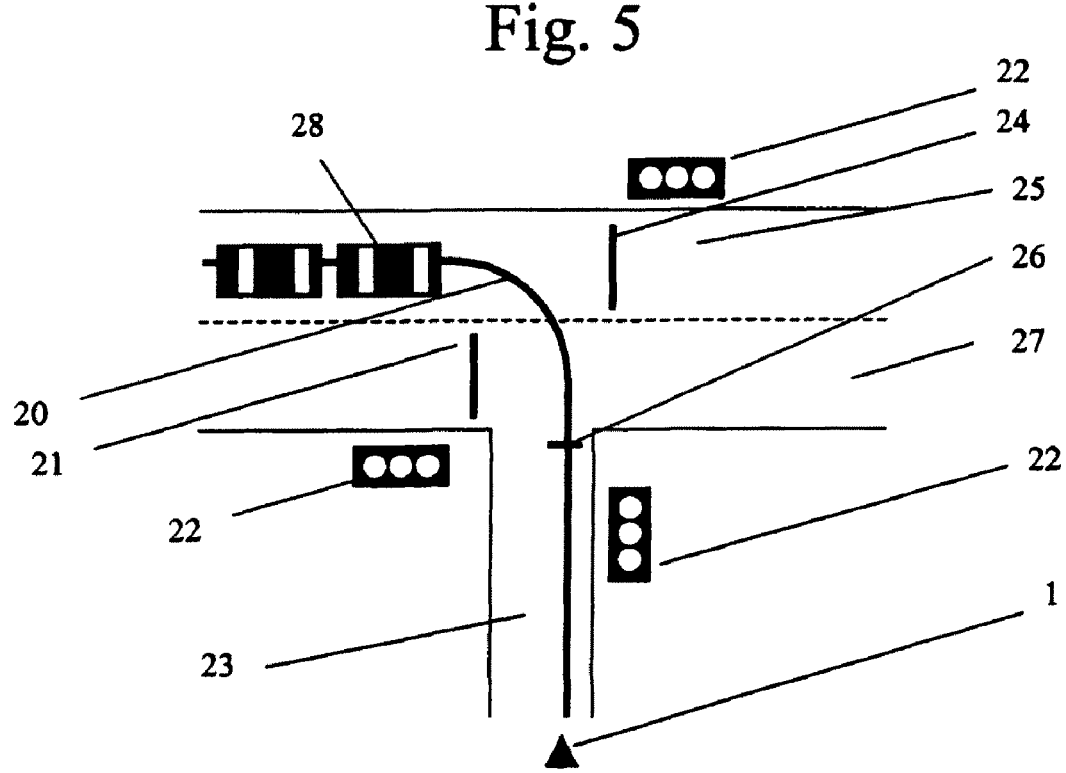
FIG. 6 shows an exemplary left-turn maneuver into a road with right of way with traffic lights.

FIG. 6 shows an exemplary left-turn maneuver. The planned turn maneuver 20 leads from a road 23 without right of way into a road 27 with right of way. The traffic is controlled by traffic lights 22 and stop lines 21, 24, 26. Other vehicles 28 are disposed in the lane of the road 25 with right of way, which is to be traveled along within the framework of the turn maneuver 20. By contrast with the situation shown in FIG. 5, the traffic here is regulated by traffic lights 22. This significantly simplifies the left-turn maneuver. However, since other vehicles 28 are disposed in the planned path of the left-turn maneuver, the difficulty is increased because of the possibility of a blocked crossing. Accordingly, a moderate difficulty is also obtained for this example.

Figure 7:
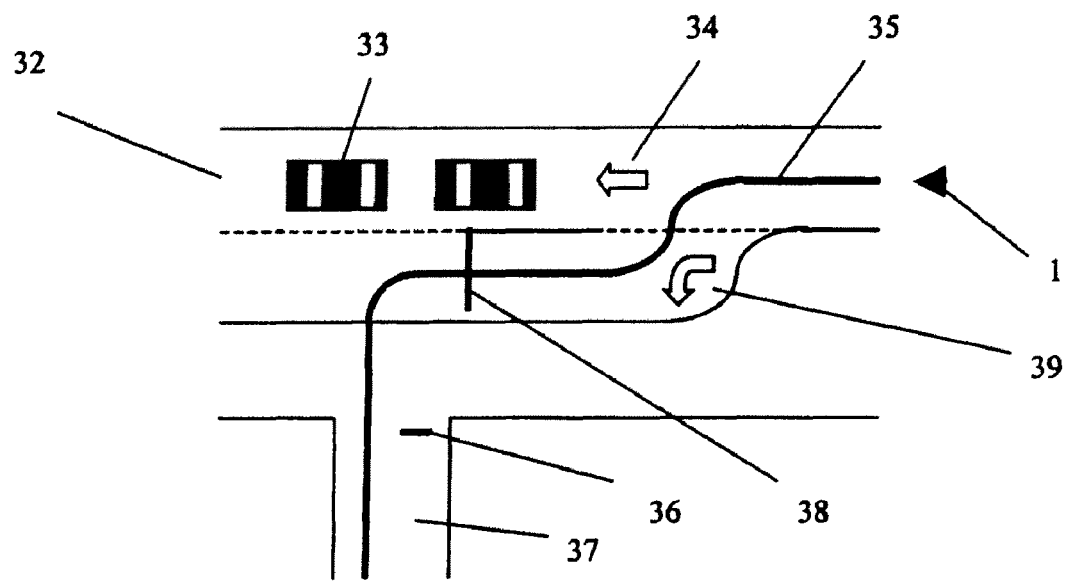
FIG. 7 shows an exemplary left-turn maneuver with a turning lane.

FIG. 7 shows an exemplary left-turn maneuver. The turn maneuver is from a road 32 with right of way into a road 37 without right of way. The planned turn maneuver 35 leads via a separate left-turn lane 39 of the road 32 with right of way. Other vehicles 33 are disposed on the straight-ahead lane 34 of the road 32 with right of way. The traffic is further regulated by stop lines 36, 38. In this situation, the static parameters: presence of a turning lane and absence of traffic lights are particularly relevant for the evaluation of the difficulty. Since potential oncoming traffic must be crossed, this turn maneuver is classified with medium difficulty. As for all further exemplary situations, the difficulty is further influenced by parameters, which are not illustrated, such as the lighting situation or the weather.

Figure 8:
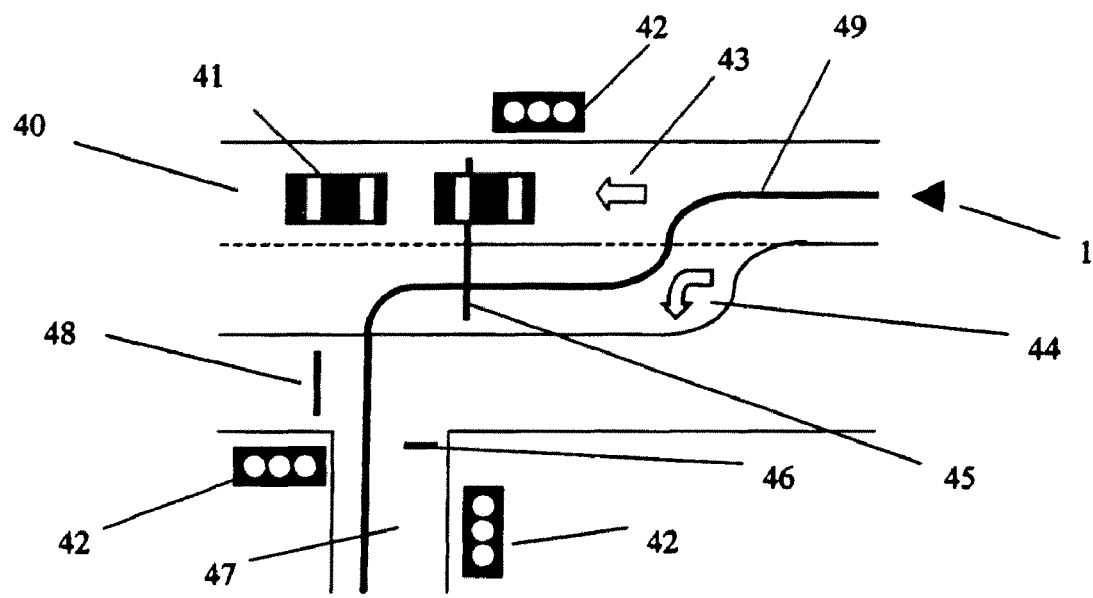
FIG. 8 shows an exemplary left-turn maneuver with a turning lane and traffic lights.

FIG. 8 shows an exemplary left-turn maneuver. The turn maneuver is from a road 40 with right of way into a road 47 without right of way. The planned turn maneuver 49 leads via a separate left-turn lane 44 of the road 40 with right of way. Further vehicles 41 are disposed on the straight-ahead lane 43 of the road 40 with right of way. Furthermore, the traffic is regulated by stop lines 45, 46, 48 and traffic lights 42. By contrast with the traffic situation illustrated in FIG. 7, the traffic here is regulated by traffic lights 42. This means that no oncoming traffic needs to be crossed during the turn maneuver. The maneuver is additionally simplified by the presence of a turning lane. Accordingly an evaluation of low difficulty is obtained for this situation.

Figure 9:
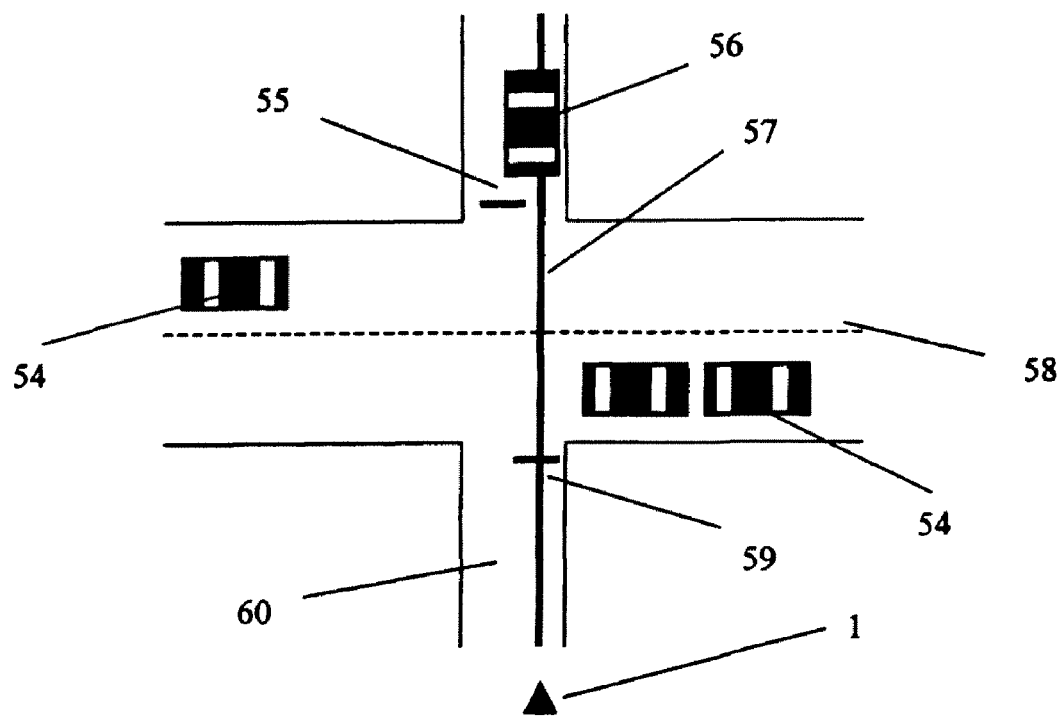
FIG. 9 shows an exemplary crossing of a crossroad.

The exemplary crossing of a crossroad is illustrated in FIG. 9. The planned crossing maneuver 57 begins in a road 60 without right of way. A road 58 with right of way is crossed. On the far side of the road 58 with right of way, another vehicle 56 is disposed in the road 60 without right of way. Other vehicles 54 are crossing on the road 58 with right of way. In this situation, the static parameters: crossing maneuver and absence of traffic lights, and the dynamic parameter: crossing traffic are particularly relevant for the evaluation of difficulty. A high difficulty is allocated to this maneuver because several traffic lanes with crossing traffic must be crossed without traffic lights.

Figure 10:
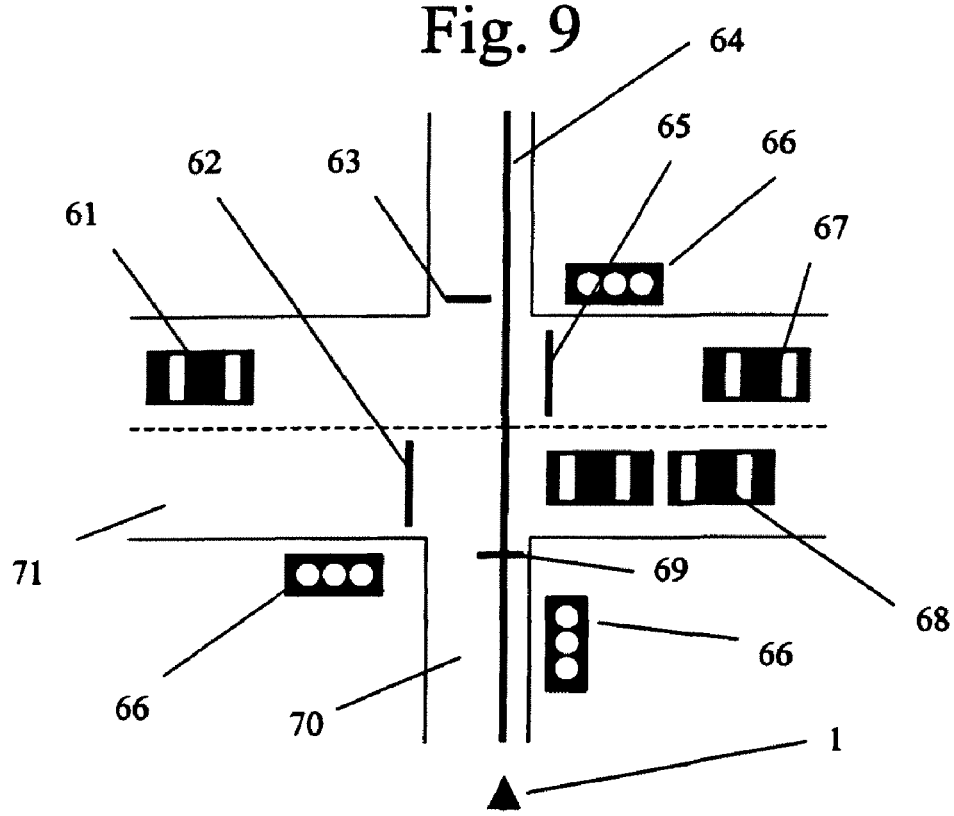
FIG. 10 shows an exemplary crossing of a crossroad with traffic lights.

An exemplary crossing at a crossroad with traffic lights 66 is illustrated in FIG. 10. The crossing maneuver 64 begins in a road 70 without right of way and crosses a road 71 with right of way. Alongside the traffic lights 66, the traffic is regulated by stop lines 62, 63, 65, 69. Other vehicles 61, 67, 68 are disposed on the road 71 with right of way. By contrast with the situation presented in FIG. 9, the traffic here is regulated by traffic lights 66. This removes the influence of the crossing traffic 68. Accordingly, only a low difficulty is allocated to this crossing maneuver.

Figure 11:
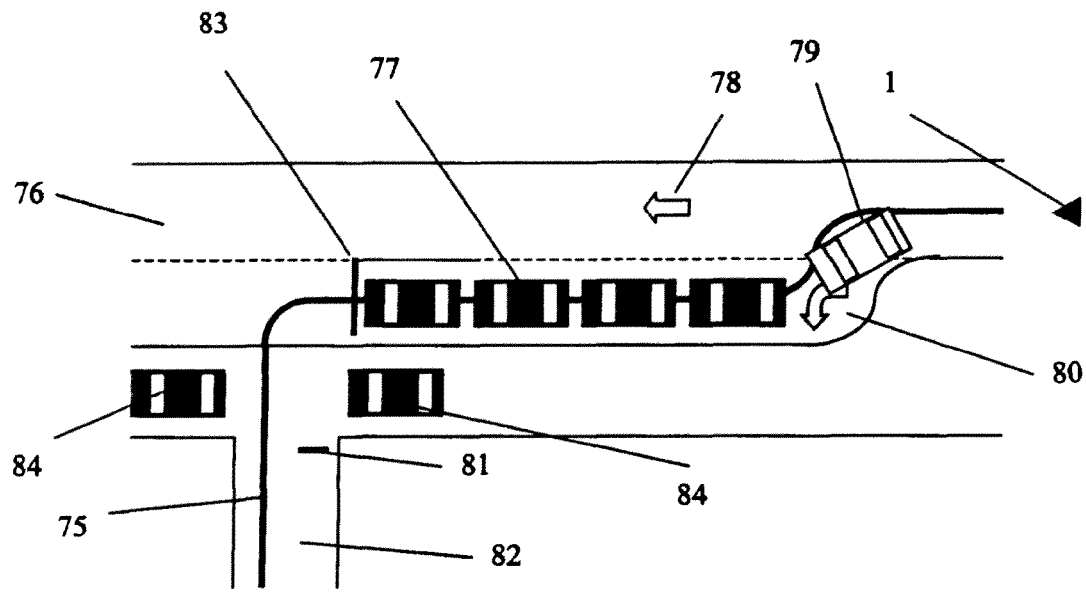
FIG. 11 shows an exemplary left-turn maneuver with a turning lane and heavy traffic volume.

FIG. 11 shows an exemplary left-turn maneuver. The planned turn maneuver 75 leads via a turning lane 80 of a road 76 with right of way into a road 82 without right of way. Other vehicles 77 are disposed in the turning lane 80. Other vehicles 84 are disposed in the oncoming traffic lane of the road 76 with right of way. The anticipated position of the vehicle 79 driven by the user is disposed at the end of a line of vehicles 77 in the turning lane 80. The traffic is regulated by stop lines 81 and 83. In this situation, the turn maneuver, the absence of traffic lights and the presence of a turning lane are relevant as static parameters and the tailback in the turning lane and the traffic in the oncoming traffic lane are particularly relevant as dynamic parameters for the evaluation of the difficulty. Since a tailback has formed in the turning lane, which forces the user to wait in the straight-ahead lane until there is space in the turning lane for his vehicle, and additionally, in the absence of traffic lights, a traffic lane with crossing traffic must be dealt with, a very high difficulty is allocated to this turn maneuver.

Figure 12:
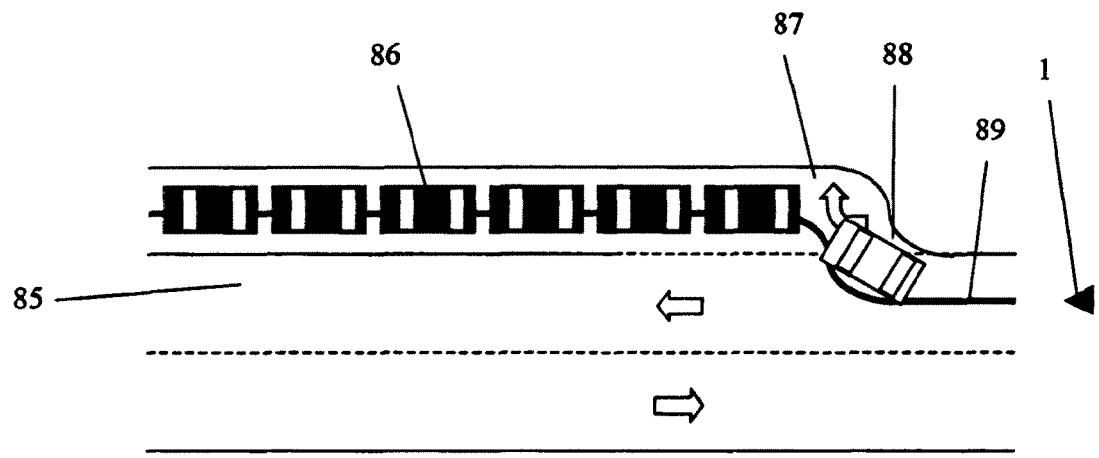
FIG. 12 shows an exemplary right-turn maneuver with a turning lane and heavy traffic volume.

FIG. 12 shows an exemplary right-turn maneuver. The planned turning maneuver 89 leads to a separate turning lane 87 of the road 85 with right of way. Other vehicles 86 are already disposed in the turning lane 87. The anticipated position of the vehicle 88 driven by the user is disposed at the end of line of vehicles 86 in the turning lane 87. In this situation, the turning direction to the right, the absence of traffic lights and the presence of a turning lane are particularly relevant as static parameters of the turn maneuver, and the tailback in the turning lane is relevant as a dynamic parameter. The direction of the turn maneuver to the right in the presence of a turning lane is evaluated in itself as low difficulty. However, since a tailback has formed in the turning lane, which forces the user to wait in the straight-ahead lane until there is space in the turning lane for her/his vehicle, a high difficulty is allocated to this turn maneuver.

FIG. 13 shows a block-circuit diagram of an exemplary embodiment of the route-finding system according to the invention. A map databank 152 is connected to a route-search system 158. The route search system 158 contains a control device 150. A user detector 153, a random access memory 154, a user databank 151 and a difficulty detector 156 are connected within the route search system 158. The route search system 158 is connected to a user interface 155 and a positioning device 159. Communication with the user takes place via the user interface 155. The difficulty detector 156 is used for determining the difficulty of the sub-routes and routes. User information is stored in the user databank 151. The user detector 153 determines the current user and acquires user data, which are stored in the user databank 151. With the assistance of the random access memory 154, the control device 150 performs the necessary calculations for route finding and controls the other components. The positioning device 159 determines the position of the user and provides this to the route search system 158.

FIG. 14 shows a flow chart illustrating an exemplary embodiment of the method according to the invention. Initially, an interrogation of the user's route requirement 200 is implemented. The data are acquired via a user entry 209. In an optional second stage, an interrogation of the routing options 201 is implemented. Here also, the data are acquired through a user entry. In an optional third stage 202, the user's skills are determined. On one hand, with a new user, this can be achieved via a direct user entry 211 or with known users via an interrogation 211a of a user-databank. The influence of the difficulty on the route finding is determined from the data regarding the user requirements or user skill in stage 203. In stage 204, using an interrogation 212 of a map databank, the route search system 158 then determines a plurality of possible routes consisting of a plurality of sub-routes. The difficulty detector 156 then implements a determination of the difficulty of the sub-routes 205. The difficulty of the routes is calculated, in stage 206, from the difficulties of the sub-routes. Using the routing options entered by the user and/or the user data, an optimum route for the user is determined from the possible routes in stage 207 and displayed in stage 208.

The invention is not restricted to the exemplary embodiment presented. As already mentioned, any traffic situations given by fixed marginal conditions, such as the course of the road, and also by dynamic conditions such as traffic density, can be used to determine the difficulty of traveling a section of the route. All of the features described above or illustrated in the drawings can be combined with one another as required within the framework of the invention.

The invention claimed is:

1. A route-finding system for locating a route within a terrain with a map databank of the terrain that contains node data and edge data, wherein nodes represent points on a path, and edges represent the connections between nodes, and with a route search system that, with specified route parameters, determines an optimal route,
   wherein a route comprises at least several sub-routes,
   wherein each sub-route comprises at least one edge,
   wherein a difficulty detector is present, which difficulty detector takes the difficulty of the sub-routes into consideration in the route finding,
   wherein a user detector is present, which user detector detects the skills of the users, which determine the influence of the difficulty of the sub-routes on the found route in the route finding, and/or a user selection, which determines the influence of the difficulty of the sub-routes on the found route in the route finding,
   wherein difficult sub-routes are characterized by the need to implement difficult maneuvers to travel the sub-route; and
   wherein the difficulty detector in a route search system determines difficult maneuvers on the basis of static route parameters and/or dynamic route parameters,
   wherein
   (a) the difficulty detector uses at least one of the following static route parameters for the determination of difficult maneuvers:
   the presence of traffic lights at a turning point or a crossing point;
   the presence of a turning lane at a turning point or a crossing point;
   the need for a change of lane;
   whether the starting position of the maneuver is disposed in a road with right of way;
   whether the destination position of the maneuver is disposed in a road with right of way; and
   the gradient of the sub-route,
   and/or
   (b) the difficulty detector uses at least one of the following dynamic route parameters for the determination of difficult maneuvers:
   the presence of a tailback on at least one lane of the road;
   the current lighting situation;
   the current time of day; and,
   the current weather conditions.

2. The route-finding system according to claim 1, wherein difficult sub-routes are characterized by the need to implement turn maneuvers and/or crossing maneuvers to travel the sub-route.

3. The route-finding system according to claim 1,
   wherein
   the difficulty detector uses at least one of the following static route parameters for the determination of difficult maneuvers:
   the presence of a turn maneuver;
   the direction of a turn maneuver;
   the angle of a turn maneuver;
   the radius of curvature a turn maneuver;
   the presence of a crossing maneuver with a road;
   the presence of a crossing maneuver with railway lines;
   the number of lanes at a turning point or crossing point;
   the permitted maximum speed at a turning point or crossing point;

the typical traffic volume at a turning point or crossing point; and the presence of right-hand traffic or left-hand traffic.

4. The route-finding system according to claim 1, wherein the difficulty detector uses at least one of the following dynamic route parameters for the determination of difficult maneuvers:

the permitted dynamically determined maximum speed;

the current traffic volume; and the currently possible maximum speed.

5. The route-finding system according to claim 1, wherein the positioning device determines the user's current position, and the user's current position is used for the route finding.

6. The route-finding system according to claim 5, wherein the positioning device is a "Global Positioning System" device.

7. The route-finding system according to claim 1, wherein the route-finding system is built into a vehicle or a portable device.

8. The route-finding system according to claim 7, wherein the portable device is a mobile telephone.

9. A method for route finding for locating a route within a terrain, which method accesses a map databank of the terrain in which node data and edge data are stored, wherein nodes represent points on a path, and edges represent connections between the nodes, and which method takes specified route parameters into consideration for the route finding, wherein a route comprises at least several sub-routes, wherein each sub-route comprises at least one edge, wherein the difficulty of the sub-routes is taken into consideration in the route finding, wherein the user's skills and/or a user selection determine the influence of the difficulty of the sub-routes on the found route in the route finding, wherein difficult sub-routes are characterized by the need to implement difficult maneuvers, in particular, turn maneuvers and/or crossing maneuvers, in order to travel the sub-route; and wherein difficult maneuvers are determined on the basis of static route parameters and/or dynamic route parameters, comprising (a) using at least one of the following static route parameters to determine difficult maneuvers:

the presence of traffic lights at a turning point or a crossing point;

the presence of a turning lane at a turning point or a crossing point;

the need for a change of lane;

whether the starting position of the maneuver is disposed in a road with right of way;

whether the destination position of the maneuver is disposed in a road with right of way; and the gradient of the sub-route, and/or (b) using at least one of the following dynamic route parameters to determine difficult maneuvers:

the presence of a tailback on at least one lane of the road;

the current lighting situation;

the current time of day;

the current weather conditions.

10. The method according to claim 9, wherein difficult sub-routes are characterized by the need to implement turn maneuvers and/or crossing maneuvers to travel the sub-route.

11. The method according to claim 9, comprising implementing the following stages:

determining a plurality of routes comprising a plurality of sub-routes that are used for traveling a path from a starting point to a destination point;

calculating the difficulty of the sub-routes;

calculating the difficulty of the routes from the difficulties of the sub-routes; and determining the optimal route taking into consideration the specified route parameters and the difficulties of the routes.

12. The method according to claim 9, comprising using one of the following static route parameters to determine difficult maneuvers:

the presence of a turn maneuver;

the direction of a turn maneuver;

the angle of a turn maneuver;

the radius of curvature a turn maneuver;

the presence of a crossing with a road;

the presence of a crossing with railway lines;

the number of lanes at the turning point or crossing point;

the permitted maximum speed at a turning point or a crossing point;

the typical traffic volume at a turning point or a crossing point; and the presence of right-hand traffic or left-hand traffic.

13. The method according to claim 9, comprising using at least one of the following dynamic route parameters to determine difficult maneuvers:

the permitted dynamically determined maximum speed;

the current traffic volume; and the currently possible maximum speed.

14. The method according to claim 9, comprising determining a current position of the user, using the user's current position for the route finding, and determining the user's current position by a positioning device.

15. The method according to claim 14, wherein the positioning device is a "Global Positioning System" device.

16. The method according to claim 9, comprising implementing the method by a device integrated into a vehicle or a portable device.

17. The method according to claim 16, comprising implementing the method by a device integrated into a mobile telephone.

* * * * *